United States Patent [19]

Bonaventura et al.

[11] Patent Number: 4,609,383
[45] Date of Patent: Sep. 2, 1986

[54] APPARATUS AND METHOD FOR EXTRACTING OXYGEN FROM FLUIDS

[75] Inventors: Joseph Bonaventura; Celia Bonaventura, both of Beaufort, N.C.; Joseph C. Van Ryzin, Kailua, Hi.; Bruce D. Zenner, Beaufort, N.C.

[73] Assignee: Aquanautics Corporation, San Francisco, Calif.

[21] Appl. No.: 653,549

[22] Filed: Sep. 24, 1984

[51] Int. Cl.⁴ .............................................. B01D 53/22
[52] U.S. Cl. ......................................... 55/16; 55/37; 55/158; 210/640; 210/321.4; 423/579
[58] Field of Search ................... 55/16, 37, 68, 158, 55/159; 210/640, 321.4; 422/48; 423/219, 579

[56] References Cited

U.S. PATENT DOCUMENTS

| | | | |
|---|---|---|---|
| 2,170,596 | 8/1939 | Quiggle | 423/219 |
| 3,228,394 | 1/1966 | Ayres | 55/16 X |
| 3,230,045 | 1/1966 | Miller | 423/579 |
| 3,333,583 | 8/1967 | Bodell | 210/321.4 X |
| 3,369,343 | 2/1968 | Robb | 55/158 X |
| 3,515,640 | 6/1970 | Rudlin | 210/321.4 X |
| 3,526,578 | 9/1970 | Silverman | 55/159 X |
| 3,651,616 | 3/1972 | Blanchard et al. | 55/16 |
| 3,751,879 | 8/1973 | Allington | 55/158 |
| 3,878,564 | 4/1975 | Yao et al. | 210/321.4 X |
| 3,910,780 | 10/1975 | Henley et al. | 55/158 |
| 3,911,080 | 10/1975 | Mehl et al. | 55/16 X |
| 3,957,504 | 5/1976 | Ho et al. | 55/158 X |
| 4,011,306 | 3/1977 | Fox, Jr. | 423/579 |
| 4,032,617 | 6/1977 | Gay | 423/579 X |
| 4,153,576 | 5/1979 | Karol et al. | 423/219 X |
| 4,198,792 | 4/1980 | Christensen et al. | 55/66 |
| 4,268,279 | 5/1981 | Shindo et al. | 55/158 X |
| 4,287,170 | 9/1981 | Erickson | 423/579 |
| 4,325,715 | 4/1982 | Bowman et al. | 55/159 X |
| 4,343,715 | 8/1982 | Bonaventura et al. | 423/579 X |
| 4,381,407 | 4/1983 | Bremus et al. | 202/158 X |
| 4,427,416 | 1/1984 | Bonaventura et al. | 210/321.4 X |
| 4,442,297 | 4/1984 | Hill et al. | 549/206 |
| 4,451,270 | 5/1984 | Roman | 55/38 |
| 4,488,951 | 12/1984 | Nolan et al. | 423/579 X |
| 4,514,522 | 4/1985 | Sievers et al. | 521/53 |
| 4,542,010 | 9/1985 | Roman et al. | 55/16 X |

OTHER PUBLICATIONS

U.S. Bureau of Mines Information, Circular No. 7906, 1959, Stewart et al, Investigation of Oxygen Production by Metal Chelates.
Industrial and Engineering Chemistry, vol. 39, No. 1, Fogler, Regenerative Unit for Generating Oxygen.
Compressed Air Magazine, Nitrogen.
Chemtech, Sep. 1976, The Case of Aircraft $O_2$ System Based on Metal Chelates.

Primary Examiner—Robert Spitzer
Attorney, Agent, or Firm—Oblon, Fisher, Spivak, McClelland & Maier

[57] ABSTRACT

An apparatus for extracting oxygen from an environment surrounding the apparatus, which comprises a container having an interior space isolated from physical contact with the environment at least in part by a gas permeable membrane having a first and a second side, wherein the membrane contacts the environment on the first side of the membrane, a carrier fluid in contact with the second side of the membrane in the first container, and a non-proteinaceous oxygen binding compound contained in the carrier fluid, wherein the compound comprises a tetradentate chelating molecule, a metal ion chelated in the molecule, and a nitrogenous base chelated to the metal ion, is disclosed along with a method for extracting oxygen from environmental fluids.

25 Claims, 2 Drawing Figures

APPARATUS AND METHOD FOR EXTRACTING OXYGEN FROM FLUIDS

BACKGROUND OF THE INVENTION

1. Field of the Invention

This invention relates to an apparatus for and a process of extracting oxygen from fluids in which the oxygen is dissolved.

2. Description of the Prior Art

One of the primary problems which hinders man in his efforts to explore and develop the ocean realms is the lack of a ready supply of oxygen. In most of the world's oceans, the oxygen content of both shallow and deep waters is similar to that of surface water in equilibrium with air. Practical methods have not yet been devised for extracting and utilizing this vast amount of oxygen for the maintenance of man in an undersea environment. Fish, however, have obviously solved the problem of oxygen extraction from seawater. Fish species weighing well over a thousand pounds and burning metabolities at rates roughly comparable to that of man easily extract adequate dissolved oxygen from seawater for their varied activities. Moreover, many species of fish transfer oxygen from seawater into a gaseous state. These fish, ones that possess swim bladders, are able to pump and concentrate oxygen against enormous hydrostatic pressure gradients. In certain fish species oxygen is transported from the dissolved state in seawater, with a $_pO_2$ of 0.2 atmospheres, to a gaseous phase in the swim bladder where the $_pO_2$ may exceed 100 atmospheres.

Many attempts to develop methodologies of extracting oxygen from gaseous mixtures or water are known. Warne et al, U.S. Pat. No. 2,217,850, and Folger et al, U.S. Pat. No. 2,450,276, disclose processes of separating oxygen from other gases using solutions of cobalt compounds. However, these techniques would be ineffective in a liquid system, e.g., seawater, since the compounds are in solution and would be washed away if contacted with liquids rather than the disclosed gases. Miller, U.S. Pat. No. 3,230,045, discloses using oxygen-binding chromoproteins such as hemoglobin and hemocyanin to separate oxygen from other gases. The chromoproteins are kept moist or in solution and are immobilized on filter paper where they may be bound by a binder such as fibrin, and an electrolyte such as sodium chloride may be present. However, this technique would also be ineffective in a liquid system since the protein is not insoluble and thus would be washed away if water were allowed to flow through the system. Moreover, there is no provision for regeneration of oxidized (inactive) oxygen carriers that would be formed in this system. Bodell, U.S. Pat. No. 3,333,583, and Robb, U.S. Pat. No. 3,369,343, disclose apparatus for extracting oxygen from seawater using thin tubes of silicone rubber or a membrane of silicone rubber, respectively. However, neither the capillary networks nor the permeable membranes working alone have been found to be practicable in real-life situations. Isomura, U.S. Pat. No. 3,377,777, discloses concentrating oxygen from natural waters by equilibration with exhaled gases, i.e., by utilizing large areas of gas-water interface and simple diffusional considerations such that the partial pressure of the gas phase and the partial pressure of the liquid phase in the extraction zone provide for release of oxygen from the liquid phase into the gas phase and absorption of $CO_2$ by the water phase. Additionally, the solubility of oxygen in seawater is decreased by heating the seawater, and this heating also increases the solubility of $CO_2$. However, the heating of the seawater produces an energetically undesirable process. Rind, U.S. Pat. No. 4,020,833, discloses an oxygen source for closed environments comprising a mixture of a metallic superoxide, which releases oxygen upon contact with $CO_2$ and water vapor, and a material which absorbs $CO_2$. However, this system suffers from the defect of the capacity being limited by the bulk amount of mixture which can be carried, i.e., it is not capable of continuously producing oxygen without replenishment. Iles et al, U.S. Pat. No. 4,165,972, discloses separating oxygen from gas mixtures using metal chelates as sorbents. However, the technique is not extendable to the extraction of oxygen from water.

Artificial oxygen carriers and their properties in solution are described by a number of researchers. Traylor et al, "Solvent Effects on Reversible Formation and Oxidative Stability of Heme-Oxygen Complexes", *J.A.C.S.* 96, 5597 (1974) discloses the effect of solvent polarity on oxygenation of several heme-base complexes prepared by reduction with sodium dithionite or a mixture of Pd black and calcium hydride. Crumbliss et al, "Monomeric Cobalt-Oxygen Complexes", *Science*, 6, June 1969, volume 164, pp. 1168–1170, discloses Schiff base complexes of Co(II) which form stable cobalt-oxygen species in solution instead of cobalt-oxygen-cobalt bridged complexes. Crumbless et al, "Monomeric Oxygen Adducts of N,N'-Ethylenebis (acetylacetoniminato) ligand-cobalt(III): Preparation and Properties", *J.A.C.S.* 92, 55 (1970), discloses a series of monomeric molecular oxygen carriers based on cobalt ligand complexes. Dufour et al, "Reaction of Indoles with Molecular Oxygen Catalyzed by Metalloporphyrins", *Journal of Molecular Catalysis*, 1, 277 (1980), discloses the catalysis of the oxygenation of simple, alkyl-substituted indoles by Co(II), Co(III), and Mn(III) meso-tetraphenyl-porphines wherein a ternary complex $O_2$-CoTPP-indole is formed initially. Brault et al, "Ferrous Porphyrins in Organic Solvents: I. Preparation and Coordinating Properties", *Biochemistry*, 13, 4591 (1974), discloses the preparation and properties of ferrous deutereporphyrin dimethyl ester and ferrous mesotetraphenylporphine in various organic solvents. Chang et al, "Kinetics of Reversible Oxygenation of Pyrroheme-N-[3-(1-imidazolyl)propyl]amide", discloses studies on the oxygenation of pyrroheme-N-[3-(1-imidazolyl)-propyl]amide, i.e., a synthesized section of the myoglobin active site. Castro, "Hexa and Pentacoordinate Iron Poryhyrins", *Bioinorganic Chemistry*, 4, 45–65 (1974), discloses the direct synthesis of hexa and pentacoordinate iron porphyrins, i.e., the prosthetic groups for the active sites of certain cytochrome and globin heme proteins. Chang et al, "Solution Behavior of a Synthetic Myoglobin Active Site", *J.A.C.S.*, 95, 5810 (1973), discloses studies on a synthesized section of the myoglobin active site and indicates that the oxygen binding reaction does not require the protein. Naturally occurring oxygen carriers have been chemically cross-linked and their properties described. Bonsen et al, U.S. Pat. No. 4,053,590, discloses a polymerized, cross-linked, stromal-free, hemoglobin proposed to be useful as a blood substitute. Morris et al, U.S. Pat. No. 4,061,736, discloses intramolecularly cross-linked, stromal-free hemoglobin. Wong, U.S. Pat. No. 4,064,118, discloses a blood substitute or extender prepared by coupling hemoglobin with a polysaccharide material.

Mazur, U.S. Pat. No. 3,925,344, discloses a plasma protein substitute, i.e., an intramolecular, cross-linked hemoglobin composition. Other oxygen binding compounds are discussed in J. Amer. Chem. Soc., 105,6585 (1983), which is a review article discussing many such compounds; Macromolecules, 14,1153 (1981), which discusses so-called picket-fence porphyrins; and J. Amer. Chem. Soc., 94,5125 (1972), which discusses cobalt protoporphyrins with a 1-methylimidazole ligand as an oxygen binder.

An additional area of relevant prior art encompasses blood oxygenators. Many apparatus useful for extracorporeal blood oxygenation use oxygenpermeable membranes to supply oxygen to blood. Examples of patents which have issued or which have been published in this field include the following: PCT Published International Application No. 8100522 discloses a gas-permeable membrane and a blood oxygenator based on its use; British patent No. 1,570,917 discloses a blood oxygenator; German OS No. 2,851,776 (June 12, 1980) discloses a film-like selective permeable-membrane unit for mass transfer between fluids; U.S. Pat. No. 4,199,458 discloses a membrane diffusion device with external compression; U.S. Pat. No. 4,183,962 discloses oxygenating blood by the utilization of liquid membranes; published Netherlands patent application No. 7900345 discloses a liquid-membrane-forming apparatus; U.S. Pat. No. 4,151,088 discloses a membrane diffusion device; U.S. Pat. No. 4,110,220 discloses a mass transfer device useful for blood oxygenation; Japanese Kokai No. 7816365 discloses an apparatus for equilibrating solutions with various gases; USSR patent No. 577,037 discloses a membrane for artificial oxygenation of blood; French patent No. 2,315,283 discloses a method and apparatus for oxygenation of blood; U.S. Pat. No. 4,031,012 discloses a separatory apparatus useful for oxygenating blood; U.S. Pat. No. 3,996,141 discloses a dialysis membrane useful for blood oxygenation; U.S. Pat. No. 3,989,626 discloses a membrane transfer process and apparatus; British patent No. 1,442,754 discloses improvements in an apparatus for effecting mass transfer between fluids; British patent No. 1,447,174 discloses improvements in a membrane diffusion device; Canadian patent No. 1,156,414 discloses a microporous siloxane polymer membrane; Swedish patent No. 423,678 discloses a blood oxygenator; U.S. Pat. No. 4,353,799 discloses a hydrophobic diffusion membrane with a wettable surface useful for blood oxygenators; German OS No. 3,106,188 (Aug. 26, 1982) discloses an oxygenator membrane; published Australian patent specification No. 517,953 (Sept. 3, 1981) discloses a plate dialyser that can be used for blood oxygenation; Japanese Kokai No. 81132959 discloses an artificial lung; British patent No. 1,592,771 discloses an apparatus for mass transfer such as blood oxygenation; and French patent No. 2,478,482 discloses a gas-permeable membrane useful in blood oxygenation. In addition to these patents, many other publications related to the field of blood oxygenation can be found by a computer-assisted search of Chemical Abstracts data bases using the search terms "blood" and "oxygenation". Using the ORBIT system, these search phrases located 54 relevant publications in the 1982-present data base (CA82) and 113 relevant publications in the 1977-1981 data base (CA77).

Many of the prior art problems involving extraction of oxygen from fluids were overcome by the invention disclosed in U.S. Pat. Nos. 4,427,416 and 4,343,715, which disclose oxygen carriers which have been insolubilized at high concentrations by being entrapped and/or covalently linked to a polyurethane matrix or to comparable supports in states that are capable of reversible oxygen bonding and are regenerable in the event of oxidation. The material disclosed in these patents is generally known by the name "Hemosponge", since it is generally, though not necessarily, based on hemoglobin. The method and material as described in these patents are perfectly capable of extracting oxygen from various fluid environments in useful form, but the rate of extraction is less than that which may be desired for many applications which involve a high rate of oxygen use. Accordingly, there remains a need for an improved apparatus and method for the removal of oxygen from fluids.

SUMMARY OF THE INVENTION

Accordingly, one object of the invention is to provide an apparatus capable of extracting oxygen from a fluid at a rate higher than that which has been previously available.

It is a further object of the invention to provide an oxygen extracting apparatus which uses an oxygen carrier that can be circulated between oxygen loading and unloading stations in order to simplify the cyclic nature of the oxygen loading and unloading processes.

These and other objects of the invention as will hereinafter become more readily apparent can be attained by providing an apparatus for extracting oxygen from an environment contacting apparatus, which comprises a container having an inlet, an outlet, and an oxygen permeable membrane which together at least in part define an inner space of said container, said membrane having a first surface adapted to be in contact with said environment and a second surface facing said interior space, a carrier fluid in contact with said second surface of said membrane in said first container, and an oxygen binding compound in said carrier fluid, wherein said compound is transportable by said carrier fluid from said container to an oxygen unloading station and then back to said container.

The present invention also comprises the method by which this apparatus is used which briefly comprises contacting an external environment, which is a gas such as air or a liquid such as water, with the oxygen permeable membrane described above in order that the above-described oxygen binding compound can remove oxygen from the environment and increase the oxygen concentration first in the container and ultimately in a different desired location.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
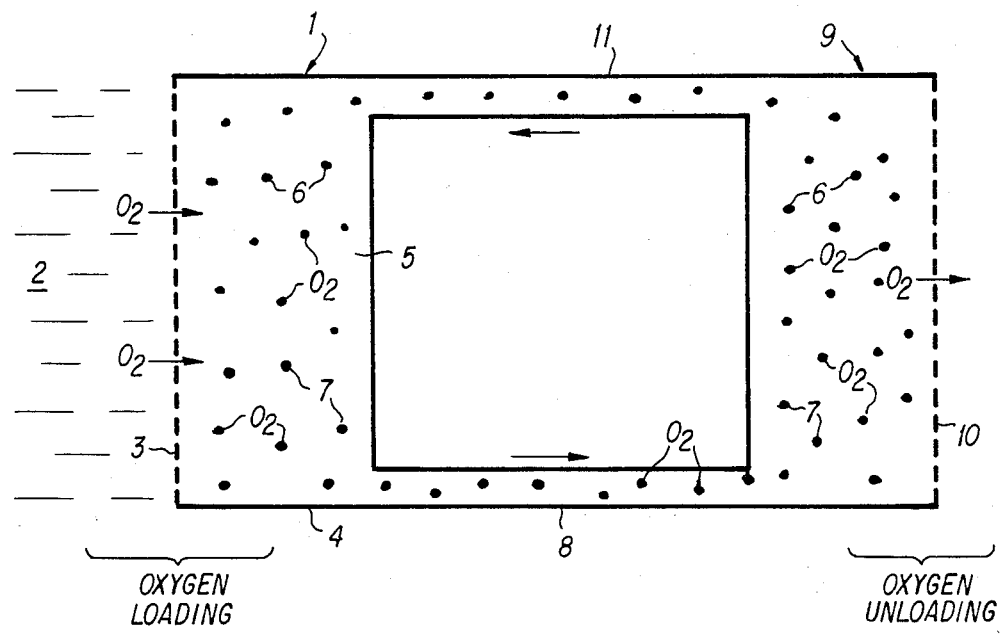
FIG. 1 is a schematic diagram of a generalized apparatus of the invention in combination with an unspecified oxygen unloading system.

The present invention provides a combination of a membrane system with a reversible oxygen binding carrier on the side of the membrane isolated from the environment to provide a more efficient system of extracting oxygen. While it is possible to use a proteinaceous compound such as hemoglobin which is capable of binding oxygen in a fluid on the side of the membrane toward which oxygen is being extracted, proteins are relatively unstable to temperature and solvent effects and are readily destroyed by biochemical attack (bacterial contamination). However, other problems were previous thought to exist if the protein was removed. For example, heme molecules (which contain iron in the +2 oxidation state) are readily oxidized (to $Fe^{3+}$) in the absence of the protective protein portion of the hemoglobin molecule. Oxidized heme is not capable of binding oxygen. Similar considerations are true for the cytochromes and other molecules containing a porphin ring. Although some theoretical investigations have been made into the stability of oxygen-binding compounds based on porphin ring systems (see previous discussion under section entitled DESCRIPTION OF THE PRIOR ART), there has been no suggestion of using either porteinaceous or non-proteinaceous oxygenbinding molecules in a closed system for extracting oxygen across an oxygen-permeable membrane. It was only with the investigations of the present inventors that it became possible to provide an apparatus and a method capable of extracting oxygen from an environment surrounding the apparatus at the rate which is now possible. For example, certain preferred embodiments of the invention are capable of extracting oxygen from seawater where it is present at a concentration of about 7 parts per million (ppm) into a carrier fluid at a concentration of 860 ppm (600 ml of STP oxygen per liter of carrier fluid), a concentration 3 times that which is present in air and over 100 times that which was present in seawater.

Hemoglobin is, of course, by far the most common oxygen carrying protein found in nature. Within this context, however, it is possible to use in commercial applications any of the hemoglobins which are available in large quantity, e.g., human, bovine, procine and equine hemoglobins. Further, whole blood, lysed cells, stripped or unstripped hemolysates can be used. Modified forms of hemoglobin, i.e., high or low affinity hemoglobins, as known in the art, are also useful. Hemoglobin can be treated to manipulate its affinity. Covalent or chemical modification, prior to immobilization, or treatment of the hemoglobin with cofactors that bind tightly and alter oxygen binding affinity (these are removable by washing the polymeric matrix with appropriate buffers) can be used. Additives, like catalase, superoxide dismutase and methemoglobin reductase, can be added to the carrier solutions. These agents are normally found in red blood cells and can be useful in conferring structural and functional stability to the hemoglobin. Additionally, reagents such as glycerol, which are known to impart structural stability to proteins in solution, can be usefully added to the solution.

Although hemoglobin is by far the most common oxygen carrier found in nature, other types of oxygen carriers are found in a number of species. In particular hemocyanin and hemerythrins are known and usable although they suffer from the deficiency of being unavailable in large quantities. See, for example, Bonaventura et al, Biochemistry, 13, 4787 (1974).

Several advantages are achieved by preferred embodiments of the invention using non-proteinaceous carriers as opposed to proteinaceous carriers such as hemoglobin. In addition to those advantages of stability previously mentioned, non-proteinaceous carriers are much smaller than hemoglobin and can therefore be packed more tightly into a fluid carrier to produce an efficient and highly concentrated oxygen extracting fluid composition. For example, when a heme molecule is used as taught herein, high concentrations of oxygen can easily be attained in the carrier. For example, 10 mM heme has a theoretical oxygen carrying capacity of 320 milligrams (914 milliliters at STP) of oxygen per liter of carrier fluid. Oxygen binding compounds capable of binding at least 320 milligrams of oxygen (when saturated) per liter of carrier are preferred. Binding capacities of 640 and 960 milligrams per liter are more preferred and most preferred, respectively.

By "non-proteinaceous" is meant a molecule which does not consist primarily or substantially of amino acids jointed together by amide bonds. Non-proteinaceous oxygen binding compounds of the invention may contain one or more amino acids and these amino acids may be linked together by a peptide bond. However, in order for a molecule to qualify as non-proteinaceous, it must contain no more than 30% by weight peptide, preferably no more than 10% peptide, and most preferably no peptide linkages at all. Preferably a compound of the invention will have molecular weight of less than 2,000 daltons and more preferably less than 1,000 daltons.

Non-proteinaceous oxygen carriers of the invention generally comprise a metal ion chelated to nitrogens of a tetradentate molecule (generally but not necessarily a cyclic molecule). Cyclic compounds typically have a tetraminotetra(trimethylene) structure forming at least part of the basic molecule. This can be represented by the formula

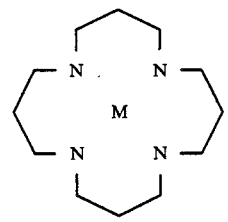

in which M represents the metal ion. Organic substituents can be present at any of the methylene carbons as long as they do not destroy the planarity of the metal binding nitrogens. Additionally any single bond shown can be replaced by a double bond (provided that cumulative double bonds are not present).

Two axial positions remain free in such molecules and are available to bind oxygen. However, in the absence of some additional chelating group to perform the same protective function as the proteinaceous portion of hemoglobin, the metal ion will often be oxidized to a nonbinding form, especially in aqueous systems. Accordingly, in preferred embodiments of the invention a nitrogenous base is provided to chelate with one side of the metal ion so that oxidation can be prevented. This can be symbolized as follows:

$$
\begin{array}{c}
N \\
-M- \\
O_2
\end{array}
$$

in which —M— represents a side view of the essentialy flat tetradentate chelating molecule and

N represents a nitrogenous base, whose various possible structures are discussed later in detail.

Many compounds which are useful in carrying out the present invention contain a porphin ring, a metal ion chelated in the ring, and a nitrogenous base chelated to the metal ion in at least one of the two possible axial positions not occupied by the porphine nitrogens. Porphin itself is a tetrapyrrole having the following structure:

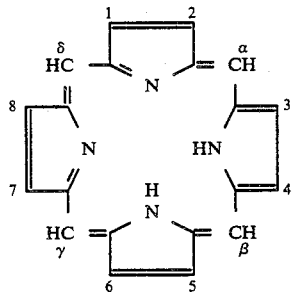

The porphin ring occurs widely in nature, particularly in compounds known as porphyrins. For example, porphyrins appear in hemoglobin, myoglobin, peroxidase, catalase, and at least 5 different cytochromes (b, c, $c_1$, a, and $a_3$). The porphyrins are well known and are named according to the side-chain substituents which are found on the pyrrole rings of the base compound. Examples of known classes of porphyrins include coproporphyrins, etioporphyrins, mesoporphyrins, and protoporphyrins. The most abundant of these in nature are the protoporphyrins. Protoporphyrins contain 2 propionic acid groups, 4 methyl groups, and 2 vinyl groups. Fifteen different isomeric forms exist, depending on the sequence of substitution. The structure of the most abundant form, protoporphyrin(IX) (found in hemoglobin, myoglobin, and most of the cytochromes), is shown below.

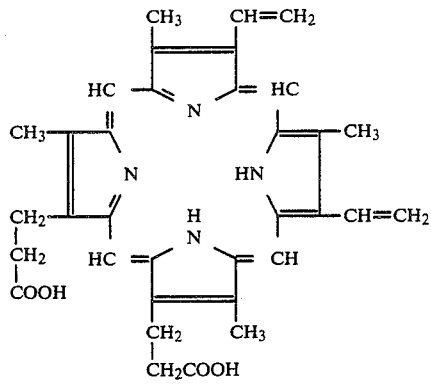

In addition to the naturally occurring porphyrin-containing molecules, synthetic porphyrin-like derivatives are also known. Several such compounds are disclosed in the prior art references previously cited. Derivatives are commonly formed by reacting one of the propionic acid side chains with a molecule that contains an amino or hydroxyl group in order to form an amide or ester link, respectively. The carboxylic acid side chains of the porphyrins also provides a convenient method of attaching these molecules to a solid support, as will be discussed later. However, functionalization of any porphyrin ring system is generally readily achieved by an organic chemist because of the reactive pyrrole rings. Thus, the number of porphyrin molecules that can be synthesized by a competent organic chemist is practically unlimited. Of these many compounds, those which are suitable for use in the present invention can be readily determined by their ability to bind oxygen. Oxygen bonding is readily determined by ultraviolet spectroscopy as is well known to those skilled in the art. (See, for example, Brinigar et al, *J.A.C.S.* 96, 5597 (1974).) Porphyrin molecules and other oxygen binding compounds which are capable of forming an oxygen complex without greater than 50% oxidation after 1 hour under 0.2 atmosphere of oxygen are preferred for the present invention.

Preferred porphyrin-containing compounds include porphyrins and alkyl esters of porphyrins, particularly those containing 1–4 carbon atoms per ester-forming alcohol. Also preferred are porphyrin derivatives in which a nitrogenase base is attached to a porphyrin through a carboxylic acid side chain. Such molecules have the formula PCO—X—$(CH_2)_y$—Z where the PCO-portion of the molecule is derived from a porphyrin having a carboxylic acid group of the formula PCOOH, X represents NH or O, y is 2–5, and Z represents a 5- or 6-membered aromatic, saturated, or ethylinically unsaturated ring containing one or two nitrogen atoms.

Protoporphyrins are particularly preferred porphyrin ring-containing structures and protoporphyrin(IX) is most preferred.

In addition to the porphyrin or similar ring, the oxygen-binding compound generally will contain a metal ion capable of bonding oxygen when chelated in the ring. Typical metal ions include iron, manganese, zinc, nickel, cobalt, and copper. Iron or cobalt in the +2 oxidation state is preferred. When $Fe^{2+}$ is present in a protoporphyrin ring system, the resulting complex is called protoheme, or more simply heme.

It will be readily recognized by those skilled in the art that a carrier molecule designed to bind one particular molecule in a biological system (or a synethetically produced carrier molecule) can often bind other molecules as well. For example, hemoglobin and other biologically derived oxygen-binding compounds can bind many ligands in addition to oxygen. For example, carbon monoxide, nitric oxide, oxygen, isocyanide, and nitroso-aromatics all bind to the reduced form of hemoglobin ($Fe^{2+}$) Hydroxide, cyanide, azide, fluoride, nitric oxide, acetate, and formate all bind to the oxidized form of hemoglobin ($Fe^{3+}$). Thus, although one often refers to hemoglobin and similar molecules as oxygen carriers, they are more correctly referred to as ligand carriers. Accordingly, any reference in this specification to an "oxygen carrier" or to a carrier as being a carrier of any particular ligand is not intended to specify that no other ligands can be carried by the same carrier molecule or that the present invention could not also be used in the extraction of other ligands from an environmental fluid.

The final component often present in an oxygen binding compound based on a central metal ion is a nitrogenous base chelated to the metal ion in one of the axial positions that remain after the porphyrin or other chelating molecule itself has formed a square-planar complex with the central metal ion. Preferred nitrogenous bases include 5- and 6-membered aromatic, saturated, and ethylinically unsaturated rings containing 1 or 2 nitrogen atoms in the ring. These compounds may be substituted by one or more, preferably one, organic substituent, preferably an alkyl group (most preferably having 1–4 carbon atoms) or an alkyl group which is itself substituted with a hydroxyl or amino group. As discussed above, compounds in which one of these nitrogen-containing rings is colvalently bound to the porphyrin ring through a carboxylic acid side-chain on the porphyrin ring are also preferred. Free (i.e., non-covalently bound) nitrogenous bases which are preferred are those in which all hydrogens on electronegative atoms have been replaced by one or more of the substituents named above in this paragraph. Imidazole and pyrrolidine derivatives having a $C_1$–$C_4$ alkyl group substituent on N-1 are particularly preferred, with 1-methylimidazole being most preferred.

The nitrogenous base ligand may be present when the oxygen binding compound is added to the carrier fluid or the ligand may be present in the carrier fluid itself. In fact, a preferred embodiment of the present invention utilizes the ligand as the carrier fluid. However, other organic solvents such as hydrocarbons, chlorinated hydrocarbons, dimethylformamide, alcohols, and the like, can also be used as the carrier fluid. Mixed solvent systems are also suitable. Examples of non-nitrogenous-base solvent systems include toluene, methylene chloride, mixed solvents containing methylene chloride and methanol, hexafluoroethylene, and the like. Aqueous solutions are also suitable, although it is essential that a nitrogenous base be selected which is capable of strongly chelating to the metal ion in order to prevent oxidation of the essential metal ion. Such bases can readily be selected from bases described herein using the spectrophotometric technique previously discussed which readily reveals both oxidation and complex formation. Nitrogenous bases which are covalently attached to the porphin ring as described above are preferred with aqueous systems.

Carrier fluids which are not miscible in water offer some advantages when oxygen is being extracted from water or an aqueous solution, such as seawater. Membranes with relatively large pores may be used to promote rapid oxygen transfer across the membrane since the two liquids will tend to stay separate and not mix in the pores. However, large pressure differences between the two surfaces of the membrane should be avoided under these circumstances to avoid forced mixing of the liquids.

Oxygen binding compounds of the invention may be free in solution or may be attached to a solid support material which is capable of circulating with the carrier fluid. For example, a carboxylate group on a porphyrin molecule may be reacted, either directly or through a divalent linking molecule, with a hydroxyl or amino group of a circulating particle, such as a finely divided polymer. Typically, a linking molecule of the formula A-L-B will be used, where A is a group capable of reacting with a functional group in the oxygen binding compound (preferably a hydroxyl or amino group when the oxygen binding compound contains a carboxylate), L is any covalently linked sequence of atoms which joins A to B and preferably comprises —$CH_2$— or paraphenylene groups or a mixture thereof which provide a separation of 5 to 50 angstroms between A and B, and B is a functional group capable of forming a bond (preferably but not necessarily a covalent bond) with the circulating particle. Examples of L include —$(CH_2)_n$— wherein n is from 1 to 20 and

wherein l and m independently represent an integer from 0 to 10. B may be an amino, hydroxyl, carboxylate or other organic functional group of moderate reactivity, a functional group capable of forming a highly reactive organic functional group such as a carbene or nitrene (for example, nitrene precursors include azides from which nitrenes can be generated by photolysis), or even non-reactive portions of a molecule such as a large alkyl or aromatic hydrocarbon portion which binds tightly to a non-polar surface by hydrophobic interactions.

The circulating particle is not limited by its chemical structure as long as oxygen binding capacity (easily measured as described above) is retained for the oxygen binding compound when it is attached to the circulating particle. Circulating particles can be prepared by grinding from solid polymers, glass, or other solid substrates, preferably to average diameters of 5–10 μ. Circulating particles as described in U.S. Pat. No. 4,427,416 can readily be adapted to the practice of the present invention by replacing the hemoglobin described therein with one or more of the present non-proteinaceous oxygen binding compounds. Also preferred are circulating particles comprising amorphous synthetic silica or controlled pore glass. The glass or silica is silanized with amino propyl silanes and carbodiimide is used to couple the amino group to a carboxylate present in the oxygen-binding compound. This is easily done with protoporphyrins, which already contain a carboxylate group. A preferred form of amorphous synthetic silica is available under the name HI-SIL T-600, PPG Industries, Inc., One Gateway Center, Pittsburgh, PA 15222.

The technology relating to the production and use of gas permeable membranes is well known and need not be set forth here in detail. See, for example, "Membrane Technology", Kirk-Othmer *Encyclopedia of Chemical Technology*, 3rd Edition, John Wiley and Sons, New York, volume 15, pages 92–131, and the references cited therein. Other membranes useful in the practice of the invention include blood oxygenation membranes, for example as described in the patents cited in the BACKGROUND OF THE INVENTION section of this application. Such membranes are more useful with circulating particles as described above since small molecules like heme and other non-porteinaceous oxygen carriers can pass through the pores of many normal blood oxygenation membranes. Certain preferred embodiments of suitable membranes are discussed here, however, in order to exemplify the invention.

The selection of a membrane for use in the present invention is not limited other than by the ability of the membrane to pass oxygen while retarding the passage of other components of the fluid environment from which the oxygen is being extracted. The phrase "oxygen permeable" as used herein refers both to traditional permeable membranes in which oxygen passes through the membrane by a dissolution process and traditional porous membranes in which oxygen passes through physical pores in the membrane wall, unless otherwise specified. Since the present invention can be used to extract oxygen both from, for example, air and seawater, it will be desirable to select a membrane based on the purpose for which it will be used. Most important synthetic membranes are formed from organic polymers, and there are extensive tabulations of permeability coefficients for various gas/polymer systems now in existence. See, for example, van Amerongen, Rubber Chem. Technol. 37, 1065 (1964); Allen et al, J. Member. Sci. 2, 153 (1977); Yasuda et al in Brandrup et al Eds., Polymer Handbook, Second Edition, John Wiley and Sons, New York, 1975, p. 111; and Bixlar et al in Sweeting, Ed., the Science and Technology of Polymer Films, Vol. II, John Wiley and Sons, New York, 1971, p. 85. In addition to oxygen permeability, inertness to the external fluid environment and the internal carrier fluid are also required. Such properties of polymers are also well known.

The physical microstructure of the membrane is not important so long as the membrane performs the function described herein. Accordingly, dense films, porous membranes, and asymmetric and composite membranes are suitable. However, membranes which do not contain pores but which pass oxygen by diffusion (solution) in the membrane itself are preferred for applications in which there is a pressure differential of one atmosphere or more on the two sides of the membrane.

The macroscopic form of the membrane is also relatively unimportant although hollow fibers are preferred over flat sheets or tubular membrane configurations since hollow fibers are self-supporting and thus eliminate the need for expensive support materials. In fact, hollow fiber cartridges in which a plurality of gas permeable hollow fibers are connected in parallel between two manifolds at opposite ends of each tube are commercially available at present and can readily be adapted for use in the present invention. For example, Romicon manufactures a hollow fiber cartridge 3 inches in diameter and 43 inches long containing 660 hollow fibers joined to manifolds at opposite ends of the cartridge. The hollow fibers have a surface area of 2.5 $m^2$ and volume of 647 ml and are in the form of a composite membrane with a silicone rubber layer on the inner surface of a porous polysulfone hollow fiber. The cartridge walls form a chamber around the hollow fibers through which the carrier fluid can be transported. Fluid from the environment e.g. seawater, is transported through the hollow fibers where extraction of oxygen into the fluid carrier takes place.

When the environmental fluid from which oxygen is extracted is an aqueous fluid, a polymer having a high permeability to oxygen is particularly preferred because of the low oxygen pressure which exists in water. Silicone rubber, natural rubber, halogenated polymers (such as fluorinated polystyrene and polyethylene), and poly(phenylene oxide), all of which have high permeability to oxygen, are particularly preferred. When oxygen is being extracted from air, high permeability is not as important. In any event, the present invention has advantages over passive diffusion systems since the partial pressure of oxygen in the carrier fluid itself is essentially zero at all times until the oxygen binding compound is saturated. Accordingly, a constant gradient across the membrane exists in practice since the oxygen bound to the carrier compound will normally be transported to a second location where the oxygen will be unloaded prior to saturation.

Another membrane of interest is poly(trimethylsilylpropyne), often abbreviated as PMSP. See, for example, J. Amer. Chem. Soc. 105, 7473 (1983), which reports that PMSP has oxygen permeability 10 times better than silicones (specifically polydimethylsiloxane in the comparison made). Another material of interest is porous polysulfone in the form of hollow fibers having an internal skin of silicone (e.g., polydimethylsiloxane). This composite material provides both strength and high oxygen transport. Composite fibers consisting of a porous outer layer and an oxygen permeable layer (here permeable is used in the traditional sense of transport by solution of oxygen in the membrane) on the inside of the fiber are preferred for use in extracting oxygen from fluids under pressure, such as seawater. Hollow fibers having interior diameters of 50 microns have been produced as have much larger hollow fibers having interior diameters of 2 millimeters. Smaller fibers have a greater resistance to pressure, with bursting strengths of 6,000 pounds per square inch having been recorded. Accordingly, small-diameter hollow fibers would allow extraction of oxygen at great depths in the ocean since a pressure of 2,000 pounds per square inch (132 atmospheres) exist at depth of 4500 feet. When working at shallow depths or when extracting oxygen from air, large diameter fibers are preferred since the larger fibers are rated up to 50 pounds per square inch bursting pressure and offer less resistance to flow, thereby reducing energy required to drive water or air through the fibers where extraction takes place. This is particularly true when large volumes of oxygen are desired to be extracted since a theoretical oxygen extraction of 1 liter per second requires that 3175 gallons of seawater must contact the membrane surface each minute. Efficiencies of extracting oxygen across membranes of 85% have been obtained in practice.

During operation, flow of carrier in contact with the second side of the membrane is balanced against oxygen flux which in turn depends on the oxygen concentration in the environment from which oxygen is being extracted and the rate at which this environment contacts the membrane. Higher oxygen carrier concentrations and faster carrier flow rates both operate to increase the rate of oxygen pick-up. High capacity oxygen carriers are therefore preferred since they decrease the required volume of carrier and minimize pumping requirements.

Preferred membranes of the invention, particularly those intended for use in an aqueous environment, should have minimal water and carrier fluid flux. Typically, water flux through the membrane is limited by selecting hydrophobic membranes, such as fluorocarbons. It is also possible to reduce water flux by using a water-immiscible solvent as the carrier fluid. For example, toluene can be used as the carrier fluid in a system in which heme bound to 1-methylimidazole is the oxygen carrier. Fluorocarbon carrier fluids are also possible.

It is of course possible to practice this invention in either a reversible or non-reversible manner; i.e., to remove oxygen from the carrier and reuse it or to merely trap oxygen in closed container. When the invention is carried out in a reversible (cyclic) manner, an oxygen unloading step must be present in addition to the loading step described above. While oxygen unloading is separate from the oxygen extraction process itself, it will be helpful to consider various ways which oxygen can be unloaded from the binding compound for use as free oxygen. For example, a chemical alteration which oxidizes or inactivates the oxygen carrier is able to cause release of all the bound oxygen. For example, ferricyanide oxidation of heme to the ferric state is a chemical means for unloading the absorbed oxygen. In this and other chemical methods it is necessary to use a regeneration cycle to reactivate the oxygen carrier if it is to be used again. For example, dithionite can be used to reduce the active sites and render them reactive toward oxygen once again.

The unloading process need not require a chemical treatment since simply decreasing the oxygen pressure in the vicinity of the oxygen carrier can be used to unload oxygen. In the absence of a chemical unloading step the system requires no regeneration. The system can thus be repetively cycled between the loading and unloading operations with great simplicity.

A particularly preferred method of unloading oxygen from a carrier involves the use of an electrochemical unloading system. Such a system is the subject of a copending application entitled "Apparatus and Method for Reversibly Removing Ligands From Carriers" filed concurrently with the present application. In such a system the oxygen carrier complexed to oxygen is passed over an electrode at which an electrochemical oxidation takes place. Since higher oxidation states of metal ions chelated by a porphin or similar ring are unable to bind oxygen, the oxygen is released into solution. Of course, a carrier which binds more tightly in a higher oxidation state can be reduced to release oxygen. After the oxygen is removed from the solution (for example, in a fuel cell or by a hollow fiber oxygen extractor if free oxygen not in solution is desired), the oxidized carrier is passed over a second electrode where reduction takes place to reform the lower oxidation state metal ion which can again bind oxygen. The oxygen binding molecule in the carrier fluid is then transported again past the membrane in contact with the environment from which oxygen is being extracted, and the cycle is repeated.

Although the apparatus of the invention as described herein comprises a combination of a membrane-containing chamber, a carrier fluid, and an oxygen binding compound, it will be readily recognized that each of these individual components can be supplied separately for assembly into a working unit by the ultimate user of the apparatus. For example, the membrane-containing chamber can be manufactured and shipped separately from the chemicals which form the carrier fluid and oxygen binding compound. In fact, this is a preferred method for storage of the individual parts since it minimizes leakage through the membrane and deterioration of the oxygen binding compound itself.

The apparatus and method of the invention can be used in any application where it is desirable to remove oxygen from an environment and concentrate it in a second location. For example, there are many applications in which the oxygen is present as a contaminant in a fluid, and removal of oxygen therefrom is desired. For example, oxygen degrades food products such as beer and orange juice, and removal of oxygen from these fluids greatly enhances the shelf storage life of the commodity.

In other applications, it is desirable to increase the concentration of oxygen above that which is present in a given environment. For example, persons afflicted with lung disorders who require a high concentration of oxygen for ease of breathing are now mostly limited to bottled oxygen, and movement of such persons is accordingly severely restricted. Miners also require oxygen in concentrations higher than that available in some mining situations. Recently, some portable units for producing oxygen-enriched air for medical uses have been marketed (Passwater et al, Am. Lab. 3, 21 (1971)). An oxygen extractor of the type described herein can readily replace these units which rely on membranes alone to provide oxygen-enriched air. In fact, the process of the present invention, in combination with a system for removing bound oxygen from the carrier molecule, provides a viable alternative to the liquification and distillation processes by which oxygen is now generally obtained from air.

Oxygen may also be extracted from water using the apparatus and method of the invention. Typical applications include supplying oxygen to free-swimming divers, to divers in submersible vehicles, to fuel cells which operate under water, and to various energy consumming engines which require oxygen for combustion processes. As few as 90 square meters of membrane surface area for the preferred embodiments disclosed herein are required to supply sufficient oxygen to operate a 10 kilowatt hour fuel cell. Even if this number is increased by an order of magnitude because of inefficiencies in membrane permeability, oxygen carrying capacity of the oxygen binding compound, concentration of the oxygen binding compound in the fluid carrier, and the like, undersea applications are readily possible since it is possible to pack up to 1500 square meters of membrane in hollow fiber form into a one cubic meter space. Accordingly, the present invention provides oxygen at a rate better than that which was available in the previously described patents relating to undersea operations listed in the prior art section of this application.

The invention will now be described with reference to certain preferred embodiments shown in the FIGURES.

FIG. 1 shows in schematic form the operation of an idealized apparatus of the present invention in combination with an oxygen unloading device of unspecified character. The essential characteristics of the apparatus of the invention include a container 1 which is in contact with the environment 2 from which oxygen is to be extracted by means of an oxygen permeable membrane 3. The remaining portion of the container walls 4 in the embodiment shown are impermeable to gas. Within the confines of container 1 is a fluid 5 which contains oxygen binding compounds 6. Oxygen passes from environment 2 through membrane 3 where it becomes bound to oxygen binding compound 6 to form a bound-oxygen complex 7. Complex 7 is transported along with fluid 5 through conduit 8 to a second container 9 where oxygen is unloaded (dissociated) from the oxygen carrier to which it is bound to produce free oxygen and free oxygen carriers. The oxygen is removed from the oxygen unloading carrier, in the embodiment shown by diffusion through gas permeable membrane 10. The fluid 5 containing the free oxygen carrier 6 is then circulated through conduit 11 back to container 1 where the process is repeated.

Figure 2:
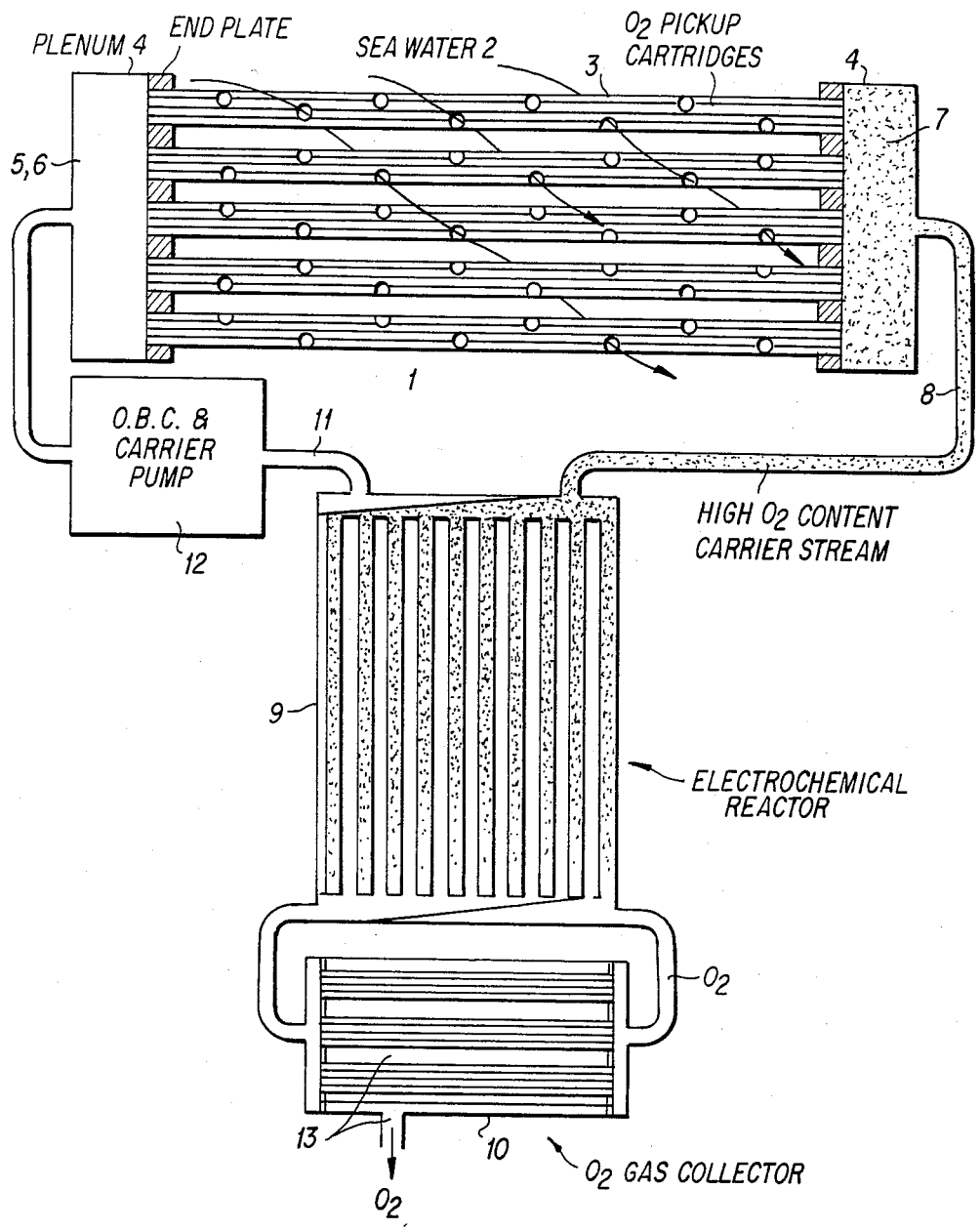
FIG. 2 is a schematic diagram of a preferred embodiment an oxygen extraction apparatus in combination with a specific oxygen unloading system.

FIG. 2 shows a schematic diagram of a particularly preferred embodiment of the invention using a hollow fiber cartridge 1 as an oxygen loading station, an electrochemical unloading system 9, and a free oxygen collection space 13 where extracted oxygen is obtained as a gas. The hollow fiber cartridge forms container 1 in which oxygen permeable membrane 3 consists of bundles of hollow fibers. Seawater from the environment (2) is flowed around the hollow fibers while carrier fluid 5 containing oxygen binding compound (OBC) 6 (not shown) passes through the interior of the hollow fibers. The oxygen binding compound binds oxygen from seawater to form a complex 7 which is isolated from the seawater environment by the gas impermeable plenum 4 into which one end of each hollow fiber is inserted. Complex 7 is transported through conduit 8 to an electrochemical reactor 9 where the oxygen carrier, in this preferred embodiment comprising a porphin ring containing a metal ion in the two plus oxidation state, is oxidized and releases the oxygen into carrier 5. Free oxygen in the carrier then passes through a gas collector which in this preferred embodiment consists of a smaller hollow fiber cartridge where free oxygen in carrier fluid 5 passes through gas permeable membrane 10 into gas collecting space 13. Carrier fluid 5 containing oxygen binding compound 6 in its oxidized form is then passed back through the electrochemical reactor where reduction takes place, making the oxygen binding compound ready to bind oxygen again. Carrier fluid 5 is then transported by means of a pump 12 through conduit 11 back to the oxygen loading station (hollow fiber cartridge 1) where the process is repeated.

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. An apparatus for extracting oxygen from an environment in contact with said apparatus, which comprises:
 a container having an inlet, an outlet, and an oxygen permeable membrane which together at least in part define an inner space of said container, said membrane having a first surface adapted to be in contact with said environment and a second surface facing said interior space;
 a carrier fluid in contact with said second surface of said membrane in said container; and
 a non-proteinaceous oxygen binding compound contained in said carrier fluid, wherein said compound comprises a tetradentate chelating molecule, a metal ion chelated in said molecule, and a nitrogenous base chelated to said metal ion.

2. The apparatus of claim 1 which further comprises:
 means for circulating said carrier fluid and said oxygen binding compound contained in said carrier fluid from said inlet through said interior space and to said outlet of said container.

3. The apparatus of claim 1 wherein said container comprises:
 a pair of manifolds, and
 a plurality of oxygen permeable tubes connected in parallel by said pair of manifolds, said manifolds disposed at opposite ends of each oxygen permeable tube.

4. The apparatus of claim 1 wherein said membrane comprises silicone rubber, polytetrafluoroethylene, an alkylcellulose, or an acetylcellulose.

5. The apparatus of claim 1 wherein said carrier fluid is an organic solvent or a mixture or solution comprising an organic solvent.

6. The apparatus of claim 5 wherein said solvent is a nitrogenous base.

7. The apparatus of claim 6 wherein said solvent is 1-methylimidazole.

8. The apparatus of claim 1 wherein said compound comprises a protoporphyrin or an alkyl ester of a protoporphyrin.

9. The apparatus of claim 1 wherein said metal is iron, magnesium, zinc, cobalt, nickel, or copper.

10. The apparatus of claim 1 wherein said metal ion is $Fe^{2+}$ or $Co^{2+}$.

11. The apparatus of claim 1 wherein said compound comprises a heme.

12. The apparatus of claim 1 wherein said compound is Fe(II) protoporphyrin IX or an alkyl ester or salt thereof complexed with 1-methylimidazole.

13. The apparatus of claim 12 wherein said carrier fluid is a nitrogenous base.

14. The apparatus of claim 13 wherein said carrier fluid is 1-methylimidazole.

15. The apparatus of claim 14 wherein said membrane is a silicone rubber-polysulfone composite membrane.

16. The apparatus of claim 15 wherein said container comprises a pair of manifolds and a plurality of oxygen permeable tubes connected in parallel by said pair of manifolds, said manifolds disposed at opposite ends of each oxygen permeable tube.

17. A method for removing oxygen from a fluid environment, which comprises:
 contacting said environment with a first surface of an oxygen permeable membrane having a first and a second surface which separates said environment from an interior space of a closed container, and
 contacting said second surface of said membrane with a carrier fluid containing a non-proteinaceous oxygen binding compound which comprises a tetradentate molecule, a metal ion chelated by said molecule, and a nitrogenous base chelated to said metal ion, wherein said compound is not saturated with oxygen, thereby removing oxygen from said fluid environment and increasing oxygen concentration in said container.

18. The method of claim 17 wherein said fluid environment is air.

19. The method of claim 17 wherein said fluid environment is water.

20. The method of claim 19 wherein said water flows past said first surface of said membrane and said carrier fluid circulates past said second surface of said membrane.

21. The method of claim 17 wherein said compound is present at a concentration capable of binding at least 340 milligrams of oxygen per liter of carrier fluid when saturated.

22. The method of claim 21 wherein said compound is a heme complexed with a nitrogenous base.

23. The method of claim 22 wherein said nitrogenous base is 1-methylimidazole.

24. The method of claim 23 wherein said nitrogenous base is said carrier fluid.

25. The method of claim 24 wherein said membrane is a silicone rubber-polysulfone composite membrane.

* * * * *